United States Patent [19]
Goldner

[11] Patent Number: 4,680,848
[45] Date of Patent: Jul. 21, 1987

[54] PIPE TAPPING TOOL

[76] Inventor: Erwin P. Goldner, 2727 Felton St., San Diego, Calif. 92104

[21] Appl. No.: 801,215

[22] Filed: Nov. 25, 1985

[51] Int. Cl.[4] ............................................. B23P 19/00
[52] U.S. Cl. .................................. 29/213 R; 137/318
[58] Field of Search ........................ 29/213 R, 213 E; 137/318

[56] References Cited

U.S. PATENT DOCUMENTS

| | | | |
|---|---|---|---|
| 455,890 | 7/1891 | Smith | 137/318 X |
| 2,017,365 | 10/1935 | Klein | 137/318 |
| 3,976,091 | 8/1976 | Hutton | 137/318 |
| 4,519,415 | 5/1985 | Carn | 137/318 |
| 4,552,170 | 11/1985 | Margrave | 29/213 E X |

*Primary Examiner*—Frederick R. Schmidt
*Assistant Examiner*—Steven P. Schad
*Attorney, Agent, or Firm*—Charmasson & Holz

[57] ABSTRACT

A machine for safely cutting a hole in a pressurized main pipe wall within an attached branch pipe, without requiring temporary main pipe clamps or permanent branch line valves and fittings. The pipe tapping machine is clamped to the branch pipe, providing a temporary seal and self-centering hole cutting guide. A valved port is provided to leak or proof test the branch pipe and sleeve prior to cutting and vent fluid after the hole is cut. Inserts can be provided to adapt to various branch pipe sizes. A hole segment retainer can also be provided to minimize downstream damage to the main pipe. Handles, ratchets and stops are provided to quickly tap the main pipe without damage to the opposite wall.

6 Claims, 5 Drawing Figures

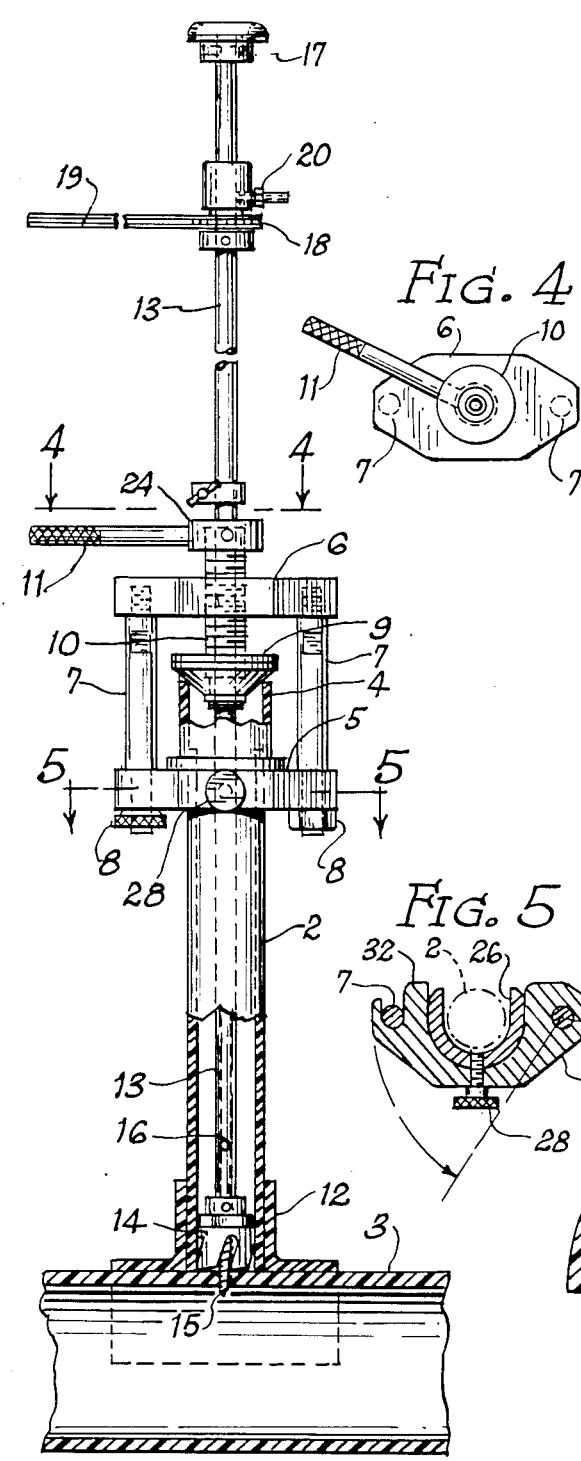
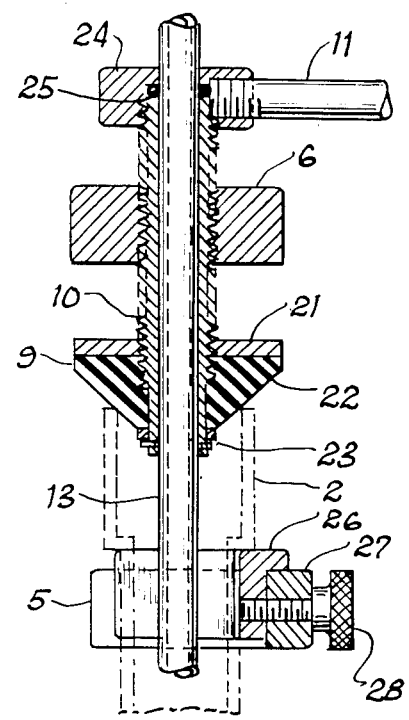
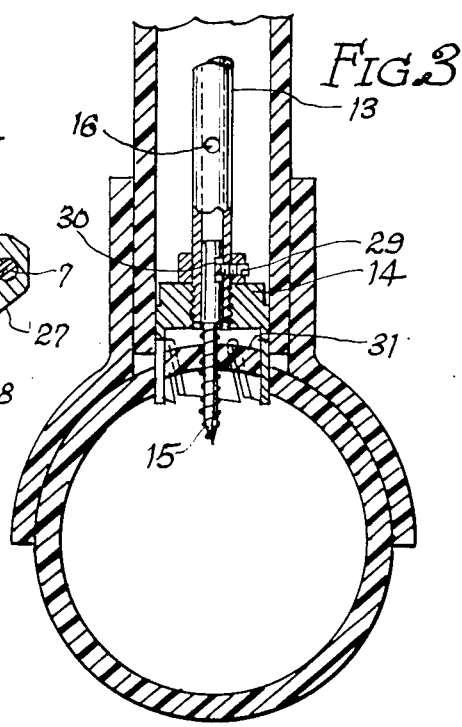

PIPE TAPPING TOOL

FIELD OF THE INVENTION

This invention relates to pipe cutters and pipe joints, and more specifically to hot pipe tapping.

BACKGROUND OF THE INVENTION

The ability to add branch pipes to existing main gas or water pipelines has long been required. The safest method is to isolate the section of main pipeline, depressurize, purge, cut a hole, clean out, and permanently attach a tee adapter and short section of branch pipe. However, in order to minimize service interruptions to nearby gas/water customers, hot tapping tools have been developed which can cut into the main pipeline while still in service, under gas or water pressure. This prior art involved attaching a branch saddle tee and short branch pipe section prior to cutting a hole in the main pipeline. A temporary clamp was placed around the main pipeline for support and hot tapping fixture was attached to the clamp. The tapping fixture included a compression seal butted against the end of the short pipe branch, a drill mounted on a shaft extending through the compression fitting and means to advance/retract the drill and compression seal. After the hole was drilled, the drill bit was retracted towards the compression seal within the now pressurized branch pipe. If a fullflow valve was not included in the branch pipe, a squeeze off tool was then used to seal the lower portion of the pressurized branch pipe, prior to removal of the temporary clamp around the main pipeline and the tapping fixture. After attaching the remainder of the branch pipe to the tapped section, the full flow valve is opened or the squeezed section rerounded. Other hot tapping tools required permanent branch pipe valves and fittings for attaching and sealing.

Several problems are inherent to these prior art techniques. The temporary main pipeline clamp installation/removal requires extensive excavation/backfilling for buried pipelines. Restricted access may prevent installation of the temporary pipeline clamp in some locations.

A second problem is that the cut hole segment is not positively retrieved. Although the main pipeline pressure tends to blow the cut segment out, the cutter tends to push it into the pipeline. If mainline flow or gravity overcomes the pressure tending to blow out cut segment, segment can damage downstream equipment.

A third problem is that the branch pipe must be separately tested for leakage prior to cutting into mainpipe or risking dangerous leakage after cutting the hole segment. If separate testing is accomplished, additional equipment is required. Additional time for set up is needed, resulting in higher cost.

A fourth problem is that upon removal of the tool, a portion of the pressurized branch pipe is discharged to the immediate area. In the case of water, this could be a high pressure stream capable of injuring people. In the case of gas, an explosive or flammable mixing could occur in the confines of an underground excavation, leading to potential disaster.

The type of tapping tool adapted to a single size of pipe or which required fittings for attachment offered little flexibility. Different tools or adapter sections were required. Leak testing of just the branch pipe was also not possible since it was not isolated. For larger sizes, the mating fittings added weight and stress to the pipe joint. Alignment of the permanent branch fittings was also required.

SUMMARY OF THE INVENTION

The principal objects of this invention are:

to provide a branch pipe tapping tool which does not require temporary clamping to the main pipe or permanent fittings and valves on the branch pipe;

to provide a tapping tool which positively retains the cut hole segment;

to provide a taping tool which allows leak testing of the branch pipe prior to cutting into main pipeline;

to provide a tapping tool which vents trapped fluids prior to removal of tool;

to provide a tapping tool which prevents excessive tool travel; and to provide a tapping tool which is adaptable to various branch pipe sizes.

These and other objects are achieved by a tapping tool which clamps to the branch pipe rather than to a clamp around the main pipeline, incorporating inserts and a conical compression seal adaptable to various branch pipe sizes, a valved port allowing leak testing and venting, and a cut segment retainer. The tool also incorporates ajustable stops to prevent excessive travel and ratchet handles to provide easy turning ability. The drill shaft is slidably mounted through the compression seal allowing easy withdrawl, simplified sealing, and avoidance of transmitting excessive compression forces to the branch tee adapter.

BRIEF DESCRIPTION OF THE DRAWINGS

FIG. 1 is an overall view and partial cross section of the tapping tool installed on a branch pipe.

FIG. 2 is a cross sectional view of the branch pipe bracket.

FIG. 3 is a cross sectional view of the cutting head, shaft and retainer cutting into a main pipeline within a branch pipe.

FIG. 4 is a top cross sectional view of the drill shaft and branch pipe bracket.

FIG. 5 is a top cross sectional view of the attachment to the branch pipe.

DESCRIPTION OF THE PREFERRED EMBODIMENTS

Referring now to the drawings, FIG. 1 shows a pipe tapping tool installed on a branch duct or pipe, 2, prepared to cut into a pressurized vessel or main pipe, 3. The branch pipe, 2, has an enlarged shoulder at the unattached end, 4, either prefabricated or upset during fabrication. A removable clamp, 5, is placed directly below the enlarged shoulder section, 4. A bracket, 6, is placed outboard of the unattached end shoulder section, 4, structurally supported from the removable clamp, 5, by two solid rods or bolts, 7 and nuts 8. Nuts, 8, may be hex head or knualed as shown. Adjustably attached to bracket, 6, is a duct end seal or conical end seal, 9, by a threaded shaft, 10. The threaded shaft, 10, also extends past the outboard side of the bracket, 6, to a handle, 11, allowing shaft, 10, and end seal, 9, to be retracted from branch pipe, 2. Clamp, 5, does not have to grip normal diameter pipe branch, 2, with this branch pipe configuration with an enlarged end because the act of sealing the unattached end by bringing end seal, 9, down will bring clamp, 5, to bear against shoulder, 4. This configuration therefore applies no additional strain on the joint fitting, 12, attaching the branch pipe, 2, to main pipe, 3, except weight. All other tool forces to the unattached end of the branch pipe, 2, are reacted at the clamp, 5. A gripping type of clamp, 5, would be required if an enlarged end, 4, were not provided.

Through the middle of the end seal, 9, and shaft, 10, passes a hollow rod, 13. Near the main pipe, 3, end, a hole cutter, 14, and cut hole segment retainer, 15, are attached. The segment retainer, 15, can be magnetized for additional holding power and/or a self threading wood screw type, mechanically retaining the cut hole segment. The retainer, 15, also serves as a centering guide. Upstream of the hole cutter, 14, is a first fluid passage, 16, to the interior of the hollow rod, 13. At the other end of the hollow rod, 13, is a knob, 17, which is used to apply transverse or axial forces to the hole cutter, 15. Near the knob, 17, is a ratchet gear, 18, and ratchet handle, 19, to apply rotational forces to the hole cutter, 14.

Also near the knob, 17, and ratchet, 18, attached to the hollow rod, 13, is a second fluid passage, 20, with a fitting and valve attached. The second fluid passage and valve, 20, allows fluid to be introduced through first passage, 16, to the branch pipe, 2, interior while it is sealed by end seal, 9. This allows leak testing and/or pressure testing prior to cutting into the main line, 3. If repairs are needed they can be accomplished without disrupting main pipe service. After closing the valve, the hole is cut and the cutter, 14, retainer, 15, shaft, 13 are lifted away from the main pipe to allow squeeze off (not shown for clarity) of the branch pipe in the configuration shown (no branch pipe valve). After squeeze off (or branch pipe valve closure), valve and second passage, 20, is opened to safely vent remaining fluid downstream of the squeeze off. If squeeze off is faulty or leaking, valve and second passage, 20, can be closed until leak can be corrected.

FIG. 2 shows a cross sectional side view of the end seal. The end seal, 9, consists of a seal backing plate, 21, which is threaded and attached to threaded shaft, 10. Sealing backing plate, 21, supports an elastomeric cone, 22, which is held in place by retainer, 23. The cone shape allows the end seal, 9, to be used for a variety of branch pipe, 2, diameters or end configurations. The threaded shaft, 10, extends through bracket, 6, to a handle, 11. Handle 11, is attached to shaft, 10, by a cap, 24. Within the shaft, 10, hollow rod, 13, is supported and sealed by o-ring, 25. The o-ring, 25, cavity is formed by a recess in shaft, 10, and end cap, 24.

The clamp, 5, is comprised of an insert, 26, a clamp body, 27, and a first set screw, 28. The insert, 26, provides adaptability for gripping (not shown for clarity) or non-grippng inserts or various diameters of branch pipe, 2. The first set screw, 28, holds the threaded insert, 26, against the clamp body, 27, to provide for transfer of forces from the clamp body, 27, to the insert, 26, to the shoulder of the pipe branch, 2.

FIG. 3 shows a cross sectional view of the hole cutter after hole segment has been cut. Hole cutter, 14, is attached to hollow shaft, 13, by a second set screw, 29. The second set screw also attaches hole segment retainer, 15, on a land, 30, provided at the top of the segment retainer, 15. The cut hole segment, 31, is held on the segment retainer, 15, by the self-tapped threaded hole in the segment. Magnetizing the sement retainer, 15, and hole cutter, 15, will minimize cuttings getting into the fluid stream. Cuttings and segment is then retracted away from the main pipe to allow squeeze off.

FIG. 4 is a section 4—4 view from FIG. 1. It shows a top view of handle, 11, on threaded shaft, 10, supported by bracket, 6. Threaded holes and the ends of bolts, 7, are also shown.

FIG. 5 is a cross section 5—5 from FIG. 1 showing a top view of the clamp, 5. Set screw, 28, holds insert, 26, against clamp body, 27. Slot, 32, allows clamp body, 27, to swing out from branch pipe, 2, for easy removal after nut(s), 8, are loosened.

While the preferred embodiment of the invention in various configurations has been described, other embodiments and configurations may be devised without departing from the spirit of the invention and the scope of the appended claims.

What is claimed is:

1. A machine for safely cutting a hole in the wall of a pressure container within a duct having an end externally attached to said pressure container and the other end unattached and open which comprises:

a clamp removably attached to said duct near the unattached end;

a bracket placed outboard of said unattached end, structurally supported from said clamp;

a hollow rod supported within said cavity and extending from both directions, said support allowing rotation and axial motion of said rod;

a hollow shaft coaxial with said duct and rod, with an interior diameter commensurate wtih the exterior diameter of said rod and a threaded exterior supported by said bracket;

a seal backing plate with a threaded hole, threadably attached near one end of the exterior of said shaft proximate to said unattached end;

a conical seal attached to said backing plate, having an axial hole commensurate with the exterior diameter of said shaft, and a maximum exterior diameter larger than said unattached end, said seal being forced into said unattached end;

means attached to the end of said rod opposite said wall for cutting holes in said wall;

means to rotate and move said hollow rod axially;

said rod having a first fluid passage from the exterior of said rod to the hollow interior near said means for cutting holes, said first passage size being sufficient to vent or fill said duct to normal pressures within said container and a second fluid passage from the interior of said hollow rod to the exterior of said rod near the end of said rod opposite to said means for cutting holes, the size of said second passage size being similar to the size of said first passage; and a means to control fluid flow in said fluid passages.

2. A machine for cutting holes claimed in claim 1 wherein said pressure container is a pipe.

3. A machine for cutting holes claimed in claim 2, wherein said seal comprises:

an elastomeric ring with an interior dimension approximately equal to the exterior diameter of said rod; and a circular groove in said bracket with an outside diameter commensurate with the exterior dimension of said ring.

4. A machine for cutting holes claimed in claim 3, wherein said bracket comprises:

a support shoulder with a central hole threaded to engage threads of said hollow shaft and two outlying threaded holes;

a pair of bolts which can engage said outlying threaded holes in said support shoulder and said attachable clamp; and a pair of nuts engaging said bolts to retain said attachable clamp.

5. A machine for cutting holes claimed in claim 4, wherein said attachable clamp comprises:

a structural member having a central slot, one outlying hole and one outlying slot, said outlying slot and hole mating with said bolts and retained by said nuts, and a threaded hole perpendicular to said duct;

an attachable semi-circular insert having an interior dimension commensurate with said duct, an exterior dimension commensurate with said central slot, said insert being engaged around duct end, being nested within said slot and having one hole perpendicular to said duct; and a retaining screw mating with said threaded hole in said structural member and extending through said hole in said attachable insert.

6. A machine for cutting holes claimed in claim 5 which also comprises:

a means to retain cut hole segments attached to said hollow rod near said means to cut holes; and a means to restrict transverse motion of said hollow rod.

* * * * *